United States Patent
Yajima

(10) Patent No.: US 9,925,603 B2
(45) Date of Patent: Mar. 27, 2018

(54) PROCESSING METHOD FOR SURFACE OF WORKPIECE USING ROTATING CUTTING TOOL

(71) Applicant: KANEFUSA KABUSHIKI KAISHA, Niwa-gun (JP)

(72) Inventor: Toshihiro Yajima, Niwa-gun (JP)

(73) Assignee: KANEFUSA KABUSHIKI KAISHA, Niwa-gun (JP)

( * ) Notice: Subject to any disclaimer, the term of this patent is extended or adjusted under 35 U.S.C. 154(b) by 0 days.

(21) Appl. No.: 15/030,540

(22) PCT Filed: Oct. 31, 2014

(86) PCT No.: PCT/JP2014/005527
§ 371 (c)(1),
(2) Date: Apr. 19, 2016

(87) PCT Pub. No.: WO2015/064114
PCT Pub. Date: May 7, 2015

(65) Prior Publication Data
US 2016/0263667 A1    Sep. 15, 2016

(30) Foreign Application Priority Data

Nov. 1, 2013 (JP) .................. 2013-228399

(51) Int. Cl.
*B23C 3/00* (2006.01)
*B23C 5/10* (2006.01)
(Continued)

(52) U.S. Cl.
CPC .............. *B23C 5/10* (2013.01); *B27M 1/003* (2013.01); *B44C 1/222* (2013.01);
(Continued)

(58) Field of Classification Search
CPC . B27M 1/003; B27C 5/02; B44C 3/06; B44B 3/02; B23C 2210/086; B23C 2210/088; B23C 2210/242
See application file for complete search history.

(56) References Cited

U.S. PATENT DOCUMENTS 2,317,262 A * 4/1943 Dusevoir .................. B23B 3/24
407/37
2,327,944 A * 8/1943 Toubhans .................. B23C 5/06
407/37
(Continued)

FOREIGN PATENT DOCUMENTS

CN    101306541 A    11/2008
CN    101602122 A    12/2009
(Continued)

OTHER PUBLICATIONS

EPO machine translation of EP 1927444, printed May 2017.*
(Continued)

*Primary Examiner* — Daniel Howell
(74) *Attorney, Agent, or Firm* — Oblon, McClelland, Maier & Neustadt, L.L.P.

(57) ABSTRACT

A processing method for a surface of a workpiece using a rotating cutting tool, includes a processing method for forming a cut pattern by rotationally cutting a surface of a workpiece using a rotating cutting tool having cutting edges extending in a rotation axis direction at a plurality of circumferentially separated positions on an outer circumference of a body thereof. Each of the cutting edges includes a plurality of segmental edges segmented at an equal pitch in the rotation axis direction. A ratio of depth d to width W (d/W) of a knife mark formed on the surface of the workpiece by the segmental edges is not less than 3/100.

10 Claims, 31 Drawing Sheets

(51) Int. Cl.
*B27M 1/00* (2006.01)
*B44C 1/22* (2006.01)
*B44C 3/06* (2006.01)
*B44B 3/02* (2006.01)

(52) U.S. Cl.
CPC ........... *B23C 2210/088* (2013.01); *B44B 3/02* (2013.01); *B44C 3/06* (2013.01)

(56) References Cited

U.S. PATENT DOCUMENTS

| | | | | |
|---|---|---|---|---|
| 2,429,822 | A * | 10/1947 | Kelly | C14B 1/48 407/31 |
| 2,643,584 | A * | 6/1953 | Wertepny | B23C 3/34 269/153 |
| 3,733,663 | A * | 5/1973 | Brucker | B23D 71/00 144/154.5 |
| 3,891,015 | A | 6/1975 | Calcagno | |
| 3,908,053 | A * | 9/1975 | Hettich | B27M 3/04 428/156 |
| 6,249,982 | B1 * | 6/2001 | Zaiser | B27G 13/04 144/230 |
| 7,784,506 | B2 * | 8/2010 | Janzen | B27C 1/10 144/154.5 |
| 2003/0113178 | A1 * | 6/2003 | Podmiglazov | B44B 3/02 409/132 |
| 2007/0014644 | A1 | 1/2007 | Masuyama | |

FOREIGN PATENT DOCUMENTS

| | | | | |
|---|---|---|---|---|
| DE | 3742942 | C1 * | 12/1988 | ............... B23C 5/10 |
| DE | 10157352 | A1 * | 6/2003 | ............ B27M 1/003 |
| DE | 102009052642 | A1 * | 5/2011 | |
| EP | 1 927 444 | A2 | 6/2008 | |
| EP | 1 927 444 | A3 | 6/2008 | |
| EP | 1 992 463 | A2 | 11/2008 | |
| JP | 49-64997 | | 6/1974 | |
| JP | 59-167203 | A | 9/1984 | |
| JP | 1-34121 | B2 | 7/1989 | |
| JP | 10-52998 | A | 2/1998 | |
| JP | 2000-61923 | A | 2/2000 | |
| JP | 2002-309500 | A | 10/2002 | |
| JP | 2003-236809 | A | 8/2003 | |
| JP | 2008-284791 | A | 11/2008 | |

OTHER PUBLICATIONS

EPO machine translation of DE 102009052642, printed May 2017.*
ProQwest machine translation of DE 102009052642, printed May 2017.*
International Search Report dated Dec. 9, 2014 in PCT/JP14/005527 Filed Oct. 31, 2014.
Extended European Search Report dated Mar. 29, 2017 in Patent Application No. 14857669.7.
Combined Chinese Office Action and Search Report dated Apr. 5, 2017 in Patent Application No. 201480059409.9.

* cited by examiner

Processing Example 1 : D4, Z2, R2, P1.25, N3000, F3.750
(Edge shape is shifted by a half pitch.)

⟶ Direction of Processing

Processing Example 2 : D4, Z2, R2, P0.50, N3000, F1.500
(Edge shape is shifted by a half pitch.)

———▶ Direction of Processing

Processing Example 3 : D10, Z2, R5, P2.80, N3000, F8.400
(Edge shape is shifted by a half pitch.)

⟶ Direction of Processing

Processing Example 4 : D4, Z2, R2, P1.25, N3000, F2.166
(Edge shape is shifted by a half pitch.)

⎯⎯→ Direction of Processing

Processing Example 5 : D4, Z2, R2, P1.25, N3000, F6.480
(Edge shape is shifted by a half pitch.)

⎯⎯⎯→ Direction of Processing

Processing Example 6 : D4, Z2, R2, P1.25, N3000, F3.000
(Edge shape is shifted by a half pitch.)

———→ Direction of Processing

Processing Example 7 : D4, Z2, R5, P1.25, N3000, F3.750
(Edge shape is shifted by a half pitch.)

⎯⎯⎯→ Direction of Processing

Processing Example 8 : D4, Z2, R1.5, P1.25, N3000, F3.750
(Edge shape is shifted by a half pitch.)

⎯⎯⎯⎯→ Direction of Processing

Processing Example 9 : D4, Z2, R1.5, P2.00, N3000, F3.750
(Edge shape is shifted by a half pitch.)

———▶ Direction of Processing

Processing Example 10 : D4, Z2, R0.8, P0.7, N3000, F2.100
(Edge shape is shifted by a half pitch.)

⟶ Direction of Processing

Processing Example 11 : D4, Z2, R20, P3, N3000, F6.000
(Edge shape is shifted by a half pitch.)

⟶ Direction of Processing

Processing Example 12 : D20, Z2, R4, P3, N3000, F9.000
(Edge shape is shifted by a half pitch.)

⎯⎯→ Direction of Processing

Processing Example 13 : D4, Z2, Concave R2, P1.25, N3000, F3.750
(Edge shape is shifted by a half pitch.)

⟶ Direction of Processing

Processing Example 14 : D4, Z2, V120, P1.25, N3000, F3.750
(Edge shape is shifted by a half pitch.)

⎯⎯→ Direction of Processing

Processing Example 15 : D6, Z3, R3, P2.10, N3000, F6.300
(Edge shape is shifted by a 1/3 pitch.)

———▶ Direction of Processing

Processing Example 16 : D6, Z4, R3, P2.00, N3000, F6.000
(Edge shape is shifted by a 1/4 pitch.)

⟶ Direction of Processing

Processing Example 17 : D4, Z2, R2, P1.25, N3000, F3.750, Cut Depth 0.02
(Edge shape is shifted by a half pitch.)

———▶ Direction of Processing

Processing Example 18 : D4, Z2, P2, N3000, F3.000
(Edge shape is shifted by a half pitch.)

⎯⎯⎯→ Direction of Processing

Processing Example 19 : D2, Z2, P1.25, N3000, F3.750
(Edge shape is shifted by a half pitch.)

⎯⎯⎯→ Direction of Processing

Processing Example 20 : D4, Z2, P1.3, N3000, F3.750
(Edge shape is shifted by a half pitch.)

———▶ Direction of Processing

Processing Example 21 : D8, Z2, P1.275, N3000, F3.000
(Edge shape is shifted by a half pitch.)

⟶ Direction of Processing

PROCESSING METHOD FOR SURFACE OF WORKPIECE USING ROTATING CUTTING TOOL

TECHNICAL FIELD

The present invention relates to a workpiece surface processing method for forming a decorative pattern on a surface of a workpiece using a rotating cutting tool such as a small-diameter milling cutter and a small-diameter end mill to be used for milling, router processing, etc. in producing a furniture component, a lightening equipment component, or the like which is formed of wood, a wood material, resin, metal, etc.

BACKGROUND ART

In surface cutting of a workpiece using a rotating cutting tool such as a milling cutter and an end mill, a knife mark is left on a cut surface of the workpiece due to a height difference at a boundary between cutting edges or the like, and impairs quality of the cut surface. Therefore, conventionally measures to reduce harmful knife marks have been exclusively taken in surface cutting of a workpiece. In contrast, as shown in Patent Document 1, a method for decorating a surface of a workpiece by making good use of such a knife mark has been proposed. This decoration method aims to decorate a surface of a workpiece by rotationally cutting the surface of the workpiece by using a rotating cutting tool having cutting edges on an outer circumference and leaving a knife mark having a width of 5 mm or more and 150 mm or less.

In Example 1 of the abovementioned patent document, as shown in FIGS. 31A, 31B, and 32, by using a cutter block having a cutting diameter D of 125 mm and the number of cutting edges of 2, cutting was performed at the number of revolutions N of 2,000 rpm and a feed rate F of 40 m/min. As a result, a knife mark was left in a shape of rectangular embossments successively extending in a rotation axis direction. This knife mark had a width Wa of 10 mm, a depth d of 0.200 mm, and a ratio of depth d to width Wa (d/Wa) of 0.020. Moreover, in Example 3, by using a rotating cutting tool having a cutting diameter D of 150 mm and the number of cutting edges of 2, cutting was performed at the number of revolutions N of 1,000 rpm and a feed rate F of 30 m/min. A knife mark had a width Wb of 9.5 mm, a depth d of 0.150 mm and a ratio (d/Wb) of 0.016. According to the abovementioned decoration method, the rotating cutting tool has a very large cutting diameter as exemplified by 125 mm and 150 mm, and the knife mark has a small ratio of depth d (mm) to width W (mm) (d/W) as exemplified by 0.016 to 0.020. Since the ratio (d/W) is as small as mentioned above, a height different in embossments on a surface produced by the knife mark is not sufficiently large and the knife mark cannot give sufficiently aesthetic appearance as a decorative pattern.

CITATION LIST

[PTL 1] Japanese Unexamined Patent Published Application No. H10-052,998

SUMMARY OF INVENTION

The present invention aims to solve the abovementioned problems. It is an object of the present invention to provide a processing method for a surface of a workpiece using a rotating cutting tool, capable of forming a decorative pattern which gives aesthetic appearance on a surface of a workpiece by using a rotating cutting tool.

In order to attain the abovementioned object, constituent features of the present invention reside in that in a processing method for forming a cut pattern by rotationally cutting a surface of a workpiece using a rotating cutting tool having cutting edges extending in a rotation axis direction at a plurality of circumferentially separated positions on an outer circumference of a body thereof, each of the cutting edges comprises a plurality of segmental edges segmented at an equal pitch in the rotation axis direction, and a ratio of depth d to width W (d/W) of a knife mark formed on the surface of the workpiece by the segmental edges is not less than 3/100. Note that although it is only necessary that a ratio of depth d to width W (d/W) of a knife mark is not less than 3/100, it is preferred that the ratio be not less than 5/100.

In the present invention having the abovementioned constitution, a ratio of depth d to width W (d/W) of a knife mark formed on a surface of a workpiece is set to be not less than 3/100. Therefore, a height difference in embossments of the knife mark on the surface of the workpiece can be fully recognized. Therefore, the knife mark regularly formed on the surface of the workpiece gives sufficiently aesthetic appearance as a decorative pattern. As a result, the processing method of the present invention can form a high value-added decoration which gives sufficiently aesthetic appearance by cutting a surface of a workpiece using a rotating cutting tool. Besides, owing to a knife mark having a sufficiently great height difference in embossments formed on the surface of the workpiece, the surface of the workpiece can serve a good nonskid function. Furthermore, upon cutting a surface of lighting equipment, light diffuses at embossments of the knife mark and accordingly, the cut surface of the workpiece can be brighter than other portions. Thus, design quality of the lighting equipment can be improved. Furthermore, in a case of a surface of a metal workpiece, a knife mark can give an oil reservoir function in addition to the decorative function.

Another aspect of the present invention resides in that in a processing method for forming a cut pattern by rotationally cutting a surface of a workpiece using a rotating cutting tool having slanted cutting edges extending slantedly with respect to a rotation axis or curved cutting edges extending curvedly with respect to the rotation axis at a plurality of circumferentially separated positions on an outer circumference of a body thereof, each of the slanted cutting edges or each of the curved cutting edges comprises a plurality of segmental edges segmented at an equal pitch along a slant or a curve, and a ratio of depth d to width W (d/W) of a knife mark formed on the surface of the workpiece by the plurality of segmental edges is not less than 3/100.

In this aspect of the present invention, cutting edges are slanted or curved. Therefore, in addition to the abovementioned operational advantages, a cut pattern on a slanted surface or a curved surface can be formed, for example, on a workpiece edge, and can give fresh aesthetic appearance which is different from a cut pattern on a plane. Moreover, with a continuous change in the diameter of segmental edges, a cut pattern continuously changes. This offers a fresh decorative effect.

Moreover, in the present invention, preferably, segmental edges of a cutting edge located at one of the plurality of positions are shifted in the rotation axis direction with respect to segmental edges of a cutting edge located at one of the plurality of positions neighboring in a rotation direction. Since segmental edges of a cutting edge located at one position are shifted by some degree of pitch with respect to segmental edges of a cutting edge located at a neighboring position, arrangement of a knife mark can be variously changed in accordance with shift by the degree of pitch and aesthetic appearance of a decorative pattern can be further improved.

Furthermore, in the present invention, an edge of each of the segmental edges can have a convex or concave arc shape, and a ratio of an edge arc radius R to a cutting diameter D of the cutting edges (R/D) can fall within a range of 0.2 to 5. Owing to this, arrangement of a knife mark can be variously changed in accordance with the size of the edge arc radius R of the segmental edges and aesthetic appearance of the decorative pattern can be further improved.

Moreover, in the present invention, each of the segmental edges can have a triangular ridge shape. Upon thus rendering a triangular ridge shape to each of the segmental edges, a sharper knife mark can be formed when compared to a knife mark in use of curved segmental edges.

Furthermore, in the present invention, a cutting diameter D of the cutting edges can be not more than 20 mm. Since a cutting diameter D of the cutting edges is set to be as small as not more than 20 mm, it becomes easy to substantially increase a ratio (d/W), so a clear decorative pattern with a great height difference in embossments can be obtained.

In the present invention, a ratio of depth d to width W (d/W) of a knife mark formed on a surface of a workpiece by using a rotating cutting tool is set to be not less than 3/100. Therefore, a height difference in embossments of a knife mark formed on the surface of the workpiece can be fully recognized, and the knife mark formed on the surface of the workpiece with regularity or a continuous change gives sufficiently aesthetic appearance as a decorative pattern. As a result, the method of the present invention can form a high value-added decoration which gives sufficiently aesthetic appearance by cutting a surface of a workpiece using a rotating cutting tool.

DESCRIPTION OF EMBODIMENTS

Figure 1:
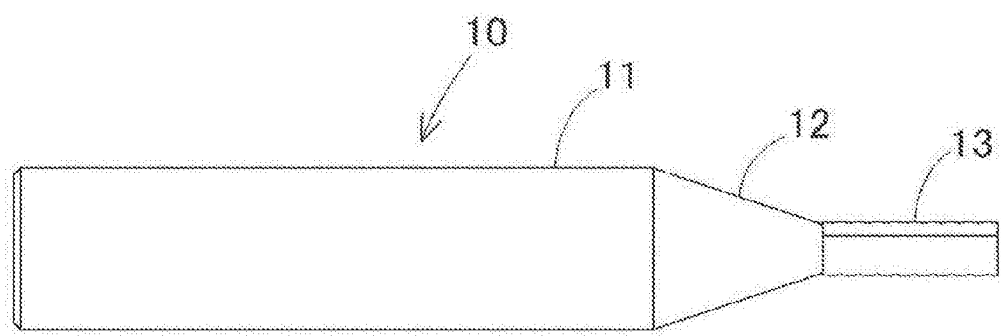
FIG. 1 is a front view schematically showing an end mill according to Example 1 of the present invention.
Figure 2A:
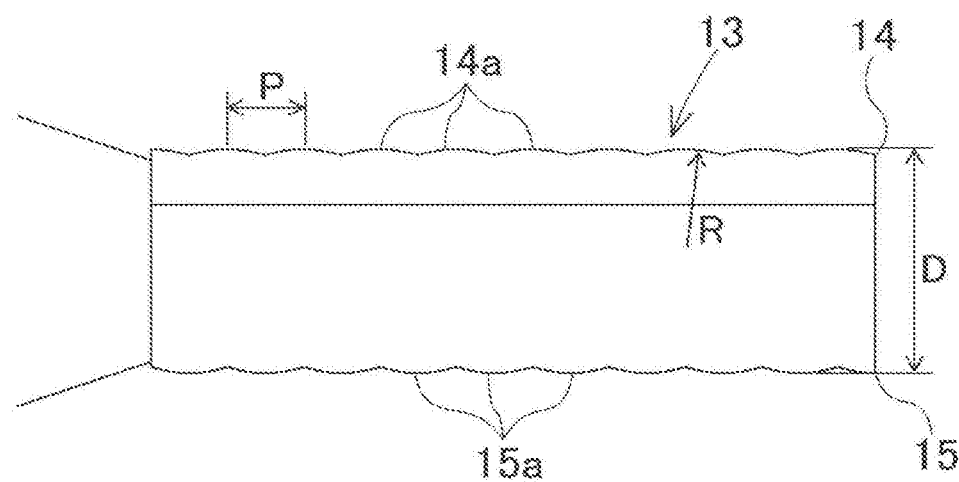
FIG. 2A is an enlarged front view showing a body portion of the end mill according to Example 1 under magnification.
Figure 2B:
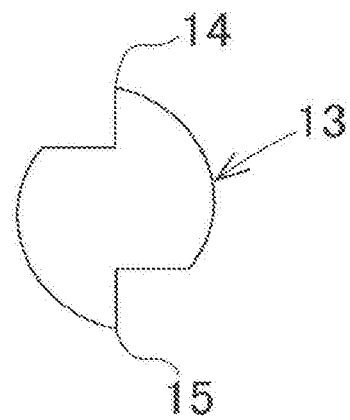
FIG. 2B is an enlarged side view showing the body portion of the end mill according to Example 1 under magnification.

Embodiments of the present invention will be described hereinafter with reference to the drawings. FIG. 1 is a front view of an end mill for rotary cutting (hereinafter referred to as an end mill) 10 according to Example 1. FIGS. 2A and 2B are an enlarged front view and an enlarged side view of a body 13 of the end mill 10, respectively. The end mill 10 has the small-diameter body 13 coaxially connected to an end portion of a large-diameter shank 11 via a connecting portion 12. At two circumferentially equally separated positions on an outer circumference, the body 13 has a pair of cutting edges 14, 15 extending in a rotation axis direction. That is to say, the number of cutting edges Z of the end mill 10 is two. Each of the cutting edges 14, 15 comprises a plurality of segmental edges 14a or 15a successively arranged in the rotation axis direction and having the same pitch P (the same length). An edge of each of the segmental edges 14a, 15a has a shape of an arc protruding outwardly with an edge arc radius R. Moreover, the segmental edges 14a are shifted by a half pitch in the rotation axis direction with respect to the segmental edges 15a. A cutting diameter D of the end mill 10 is twice distance from an edge of the cutting edge 14 or 15 at an outermost circumference to an axis of the body 13.

The end mill 10 (the number of cutting edges Z=2) can generate a variety of changes in a cut pattern formed on a surface of a workpiece by changing a cutting diameter D, an edge arc radius R, a pitch P, the number of revolutions N, and a feed rate F of the workpiece. Processing Examples 1 to 12 of formation of knife marks using the end mill 10 were simulated on a three-dimensional CAD system and will be described hereinafter. In addition, width W and depth d of each of the knife marks were calculated and a ratio (d/W) was also calculated. A cutting diameter D, the number of cutting edges Z, an edge arc radius R, a pitch P, the number of revolutions N, a feed rate F, F/N, a knife mark width W, a knife mark depth d, and a ratio (d/W) of each of Processing Examples 1 to 12 are shown below in Table 1. Note that in each of Processing Examples 1 to 12, a workpiece is cut to depth of the entire edges.

TABLE 1

| | Cutting Diameter D mm | Number of Cutting Edges Z | Edge Arc Radius R mm | Ratio R/D | Pitch P mm | Number of Revolutions N rpm | Feed Rate F m/min | F/N | Knife Mark Width W mm | Depth d mm | Ratio d/W |
|---|---|---|---|---|---|---|---|---|---|---|---|
| Processing Example 1 | 4 | 2 | 2 | 0.5 | 1.25 | 3000 | 3.75 | 1.25 | 1.250 | 0.100 | 0.080 |
| Processing Example 2 | 4 | 2 | 2 | 0.5 | 0.5 | 3000 | 1.5 | 0.5 | 0.500 | 0.016 | 0.031 |
| Processing Example 3 | 10 | 2 | 5 | 0.5 | 2.8 | 3000 | 8.4 | 2.8 | 2.800 | 0.200 | 0.071 |
| Processing Example 4 | 4 | 2 | 2 | 0.5 | 1.25 | 3000 | 2.166 | 0.722 | 0.722 | 0.044 | 0.061 |
| Processing Example 5 | 4 | 2 | 2 | 0.5 | 1.25 | 3000 | 6.48 | 2.16 | 1.422 | 0.134 | 0.093 |
| Processing Example 6 | 4 | 2 | 2 | 0.5 | 1.25 | 3000 | 3 | 1 | 1.000 | 0.067 | 0.067 |
| Processing Example 7 | 4 | 2 | 5 | 1.25 | 1.25 | 3000 | 3.75 | 1.25 | 0.874 | 0.048 | 0.055 |
| Processing Example 8 | 4 | 2 | 1.5 | 0.375 | 1.25 | 3000 | 3.75 | 1.25 | 1.250 | 0.102 | 0.082 |
| Processing Example 9 | 4 | 2 | 1.5 | 0.375 | 2 | 3000 | 3.75 | 1.25 | 1.250 | 0.145 | 0.116 |
| Processing Example 10 | 4 | 2 | 0.8 | 0.2 | 0.7 | 3000 | 2.1 | 0.7 | 0.700 | 0.038 | 0.054 |
| Processing Example 11 | 4 | 2 | 20 | 5 | 3 | 3000 | 6 | 2 | 1.222 | 0.096 | 0.079 |
| Processing Example 12 | 20 | 2 | 4 | 0.2 | 3 | 3000 | 9 | 3 | 3.000 | 0.139 | 0.046 |
| Processing Example 13 | 4 | 2 | concave R 2 | 0.5 | 1.25 | 3000 | 3.75 | 1.25 | 1.250 | 0.100 | 0.080 |
| Processing Example 14 | 4 | 2 | Edge Apex Angle V 120 deg. | | 1.25 | 3000 | 3.75 | 1.25 | 1.250 | 0.234 | 0.187 |
| Processing Example 15 | 6 | 3 | 3 | 0.5 | 2.1 | 3000 | 6.3 | 2.1 | 1.633 | 0.116 | 0.071 |
| Processing Example 16 | 6 | 4 | 3 | 0.5 | 2 | 3000 | 6 | 2 | 1.500 | 0.106 | 0.071 |
| Processing Example 18 | 4 | 2 | Straight Edges | | 2 | 3000 | 3 | 1 | 1.000 | 0.064 | 0.064 |

Figure 3A:
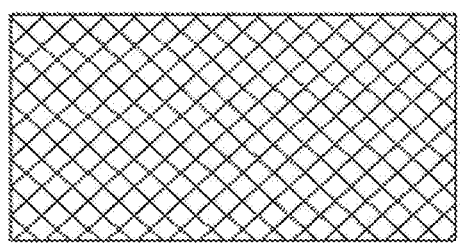
FIG. 3A is a plan view showing Processing Example 1 using the end mill according to Example 1.
Figure 3B:
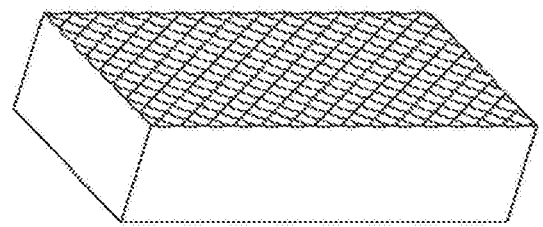
FIG. 3B is a perspective view showing Processing Example 1.

In Processing Example 1, a cutting diameter D=4 mm, an edge arc radius R=2 mm, R/D=0.5, a pitch P=1.25 mm, the number of revolutions N=3000 rpm, a feed rate F=3.75 m/min, F/N=1.25 mm. As shown in FIGS. 3A and 3B, a cut pattern of Processing Example 1 has a shape of a square grid slanted at an angle of 45 deg. with respect to a direction of machining. A knife mark has a width W of 1.250 mm and a depth d of 0.100 mm, and a ratio (d/W) of 0.080.

Figure 4A:
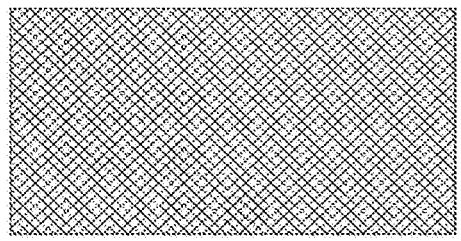
FIG. 4A is a plan view showing Processing Example 2 using the end mill according to Example 1.
Figure 4B:
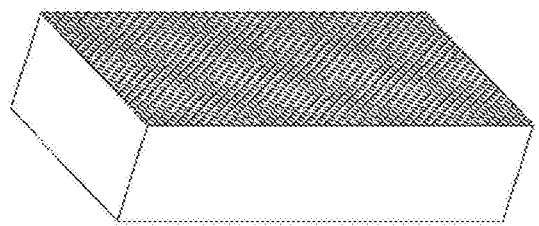
FIG. 4B is a perspective view showing Processing Example 2.

In Processing Example 2, a cutting diameter D=4 mm, an edge arc radius R=2 mm, R/D=0.5, a pitch P=0.5 mm, the number of revolutions N=3000 rpm, a feed rate F=1.5 m/min, F/N=0.5 mm. Since the pitch P and the feed rate F are smaller than those of Processing Example 1, as shown in FIGS. 4A and 4B, a cut pattern of Processing Example 2 has a shape of a much-smaller-square grid than that of Processing Example 1. A knife mark has a width W of 0.500 mm and a depth d of 0.016 mm, and a ratio (d/W) of 0.031.

Figure 5A:
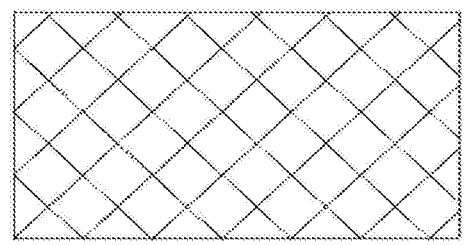
FIG. 5A is a plan view showing Processing Example 3 using the end mill according to Example 1.
Figure 5B:
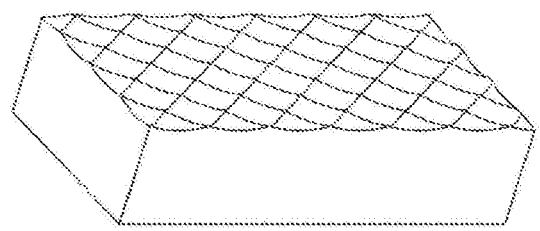
FIG. 5B is a perspective view showing Processing Example 3.

In Processing Example 3, a cutting diameter D=10 mm, an edge arc radius R=5 mm, R/D=0.5, a pitch P=2.8 mm, the number of revolutions N=3000 rpm, a feed rate F=8.4 m/min, F/N=2.8 mm. Since the cutting diameter D and the edge arc radius R are as great as 2.5 times of those of Processing Example 1, the pitch P is as great as 2.2 times of that of Processing Example 1 and the feed rate F is as great as 2.2 times of that of Processing Example 1, as shown in FIGS. 5A and 5B, a cut pattern of Processing Example 3 has a shape of a much-larger-square grid slanted at an angle of 45 deg. with respect to a direction of machining than that of Processing Example 1. A knife mark has a width W of 2.800 mm and a depth d of 0.200 mm, and a ratio (d/W) of 0.071.

Figure 6A:
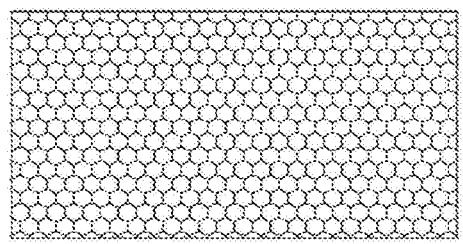
FIG. 6A is a plan view showing Processing Example 4 using the end mill according to Example 1.
Figure 6B:
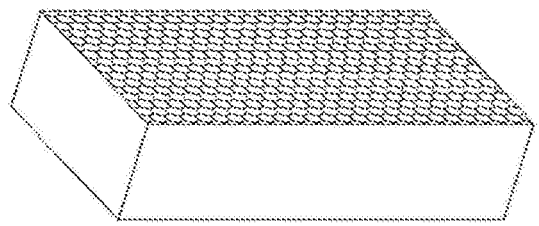
FIG. 6B is a perspective view showing Processing Example 4.

In Processing Example 4, a cutting diameter D=4 mm, an edge arc radius R=2 mm, R/D=0.5, a pitch P=1.25 mm, the number of revolutions N=3000 rpm, a feed rate F=2.166 m/min, F/N=0.722 mm. Since the feed rate F is as small as 0.6 times of that of Processing Example 1, as shown in FIGS. 6A and 6B, a cut pattern of Processing Example 4 has a shape of small regular hexagons arranged continuously in lines in a direction of machining. A knife mark has a width W of 0.722 mm and a depth d of 0.044 mm, and a ratio (d/W) of 0.061.

Figure 7A:
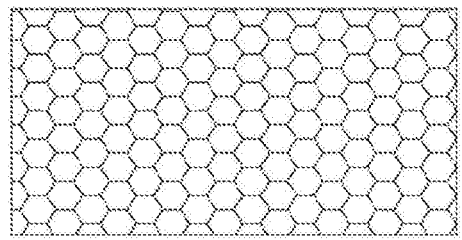
FIG. 7A is a plan view showing Processing Example 5 using the end mill according to Example 1.
Figure 7B:
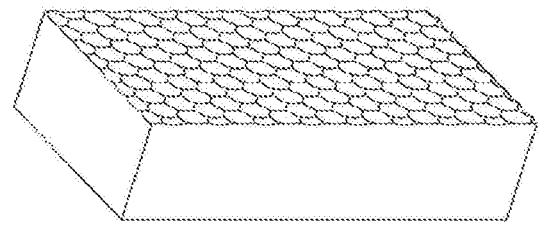
FIG. 7B is a perspective view showing Processing Example 5.

In Processing Example 5, a cutting diameter D=4 mm, an edge arc radius R=2 mm, R/D=0.5, a pitch P=1.25 mm, the number of revolutions N=3000 rpm, a feed rate F=6.48 m/min, F/N=2.16 mm. Since the feed rate F is as great as about 1.7 times of that of Processing Example 1, as shown in FIGS. 7A and 7B, a cut pattern of Processing Example 5 has a shape of large regular hexagons alternately arranged. A knife mark has a width W of 1.442 mm and a depth d of 0.134 mm, and a ratio (d/W) of 0.093.

Figure 8A:
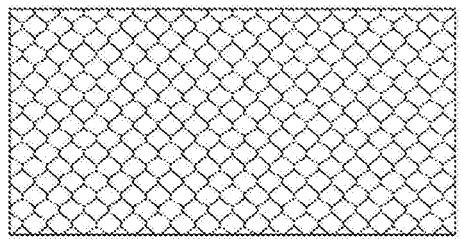
FIG. 8A is a plan view showing Processing Example 6 using the end mill according to Example 1.
Figure 8B:
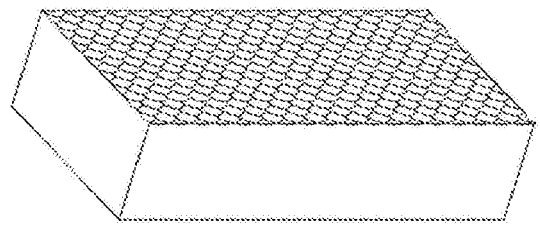
FIG. 8B is a perspective view showing Processing Example 6.

In Processing Example 6, a cutting diameter D=4 mm, an edge arc radius R=2 mm, R/D=0.5, a pitch P=1.25 mm, the number of revolutions N=3000 rpm, a feed rate F=3 m/min, F/N=1 mm. Since the feed rate F is as small as 0.8 times of that of Processing Example 1, as shown in FIGS. 8A and 8B, a cut pattern of Processing Example 6 has a shape of a grid of slight modification of the squares of Processing Example 1. A knife mark has a width W of 1.000 mm and a depth d of 0.067 mm, and a ratio (d/W) of 0.067.

Figure 9A:
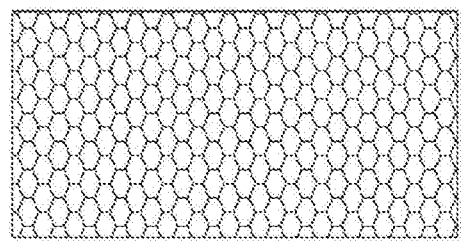
FIG. 9A is a plan view showing Processing Example 7 using the end mill according to Example 1.
Figure 9B:
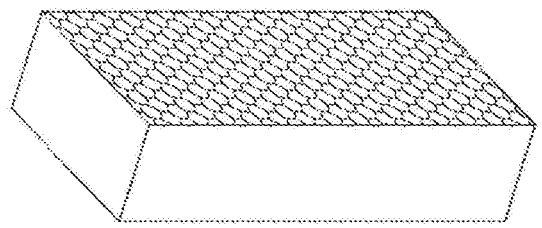
FIG. 9B is a perspective view showing Processing Example 7.

In Processing Example 7, a cutting diameter D=4 mm, an edge arc radius R=5 mm, R/D=1.25, a pitch P=1.25 mm, the number of revolutions N=3000 rpm, a feed rate F=3.75 m/min, F/N=1.25 mm. Since the edge arc radius R is as great as 2.5 times of that of Processing Example 1, as shown in FIGS. 9A and 9B, a cut pattern of Processing Example 7 has a shape of alternately arranged hexagons which are short in a direction of machining. A knife mark has a width W of 0.874 mm and a depth d of 0.048 mm, and a ratio (d/W) of 0.055.

Figure 10A:
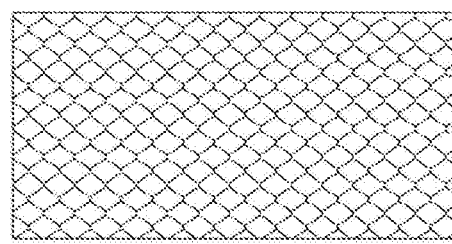
FIG. 10A is a plan view showing Processing Example 8 using the end mill according to Example 1.
Figure 10B:
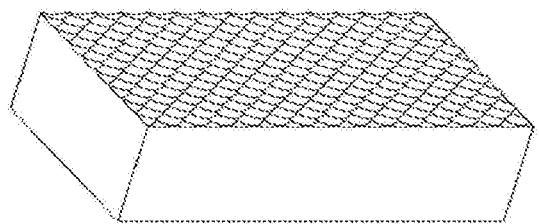
FIG. 10B is a perspective view showing Processing Example 8.

In Processing Example 8, a cutting diameter D=4 mm, an edge arc radius R=1.5 mm, R/D=0.375, a pitch P=1.25 mm, the number of revolutions N=3000 rpm, a feed rate F=3.75 m/min, F/N=1.25 mm. Since the edge arc radius R is as small as 0.75 times of that of Processing Example 1, as shown in FIGS. 10A and 10B, a cut pattern of Processing Example 8 has a shape of rhombuses, which are slight modification of the squares of Processing Example 1, arranged continuously in lines in a direction of machining. A knife mark has a width W of 1.250 mm and a depth d of 0.102 mm, and a ratio (d/W) of 0.082.

Figure 11A:
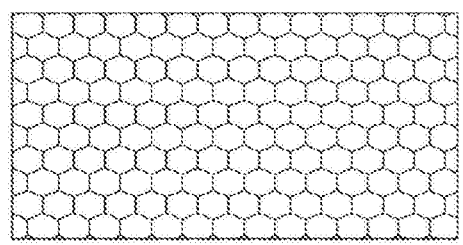
FIG. 11A, is a plan view showing Processing Example 9 using the end mill according to Example 1.
Figure 11B:
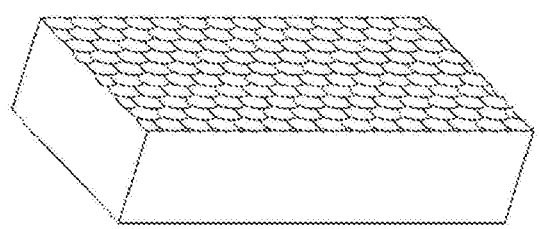
FIG. 11B is a perspective view showing Processing Example 9.

In Processing Example 9, a cutting diameter D=4 mm, an edge arc radius R=1.5 mm, R/D=0.375, a pitch P=2 mm, the number of revolutions N=3000 rpm, a feed rate F=3.75 m/min, F/N=1.25 mm. Since the edge arc radius R is as small as 0.75 times of that of Processing Example 1 and the pitch P is as great as 1.6 times of that of Processing Example 1, as shown in FIGS. 11A and 11B, a cut pattern of Processing Example 9 has a shape of hexagons arranged continuously in lines in a direction of machining. A knife mark has a width W of 1.250 mm and a depth d of 0.145 mm, and a ratio (d/W) of 0.116.

Figure 12A:
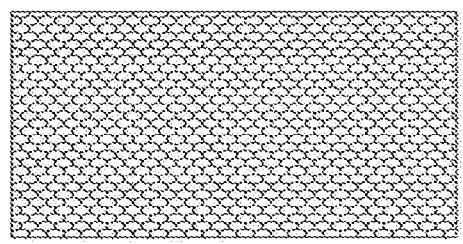
FIG. 12A is a plan view showing Processing Example 10 using the end mill according to Example 1.
Figure 12B:
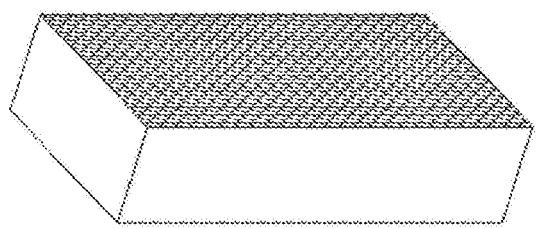
FIG. 12B is a perspective view showing Processing Example 10.

In Processing Example 10, a cutting diameter D=4 mm, an edge arc radius R=0.8 mm, R/D=0.2, a pitch P=0.7 mm, the number of revolutions N=3000 rpm, a feed rate F=2.1 m/min, F/N=0.7 mm. Since the edge arc diameter R is as small as 0.4 times of that of Processing Example 1 and the pitch P is as small as 0.56 times of that of Processing 1, as shown in FIGS. 12A and 12B, a cut pattern of Processing Example 10 has a shape of alternately arranged micro hexagons which are long in a direction of machining. A knife mark has a width W of 0.700 mm and a depth d of 0.038 mm, and a ratio (d/W) of 0.054.

Figure 13A:
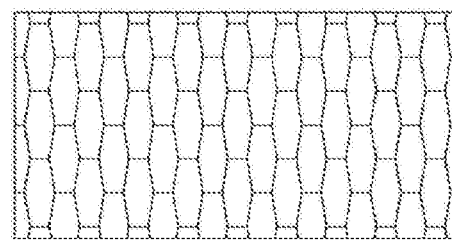
FIG. 13A is a plan view showing Processing Example 11 using the end mill according to Example 1.
Figure 13B:
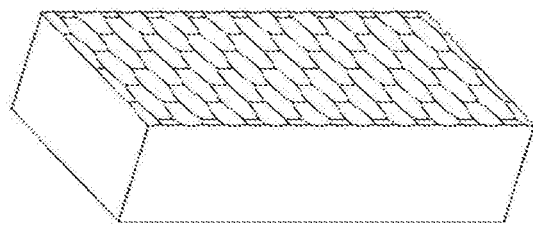
FIG. 13B is a perspective view showing Processing Example 11.

In Processing Example 11, a cutting diameter D=4 mm, an edge arc radius R=20 mm, R/D=5, a pitch P=3 mm, the number of revolutions N=3000 rpm, a feed rate F=6 m/min, F/N=2 mm. Since the edge arc diameter R is as great as 10 times of that of Processing Example 1 and the pitch P is as great as 2.4 times of that of Processing Example 1, as shown in FIGS. 13A and 13B, a cut pattern of Processing Example 11 has a shape of alternately arranged hexagons which are short in a direction of machining. A knife mark has a width W of 1.222 mm and a depth d of 0.096 mm, and a ratio (d/W) of 0.079.

Figure 14A:
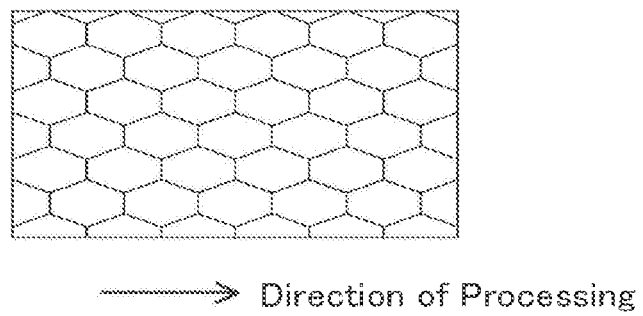
FIG. 14A is a plan view showing Processing Example 12 using the end mill according to Example 1.
Figure 14B:
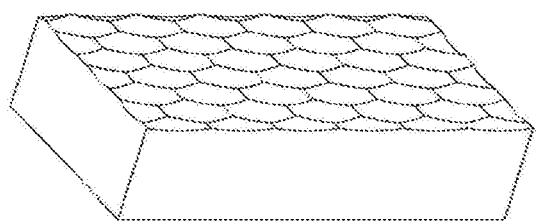
FIG. 14B is a perspective view showing Processing Example 12.

In Processing Example 12, a cutting diameter D=20 mm, an edge arc radius R=4 mm, R/D=0.2, a pitch P=3 mm, the number of revolutions N=3000 rpm, a feed rate F=9 m/min, F/N=3 mm. Since the cutting diameter D is as great as 5 times of that of Processing Example 1, the edge arc radius R is as great as two times of that of Processing Example 1 and the pitch P is as great as 2.4 times of that of Processing Example 1, as shown in FIGS. 14A and 14B, a cut pattern of Processing Example 12 has a shape of alternately arranged large hexagons which are long in a direction of machining. A knife mark has a width W of 3.000 mm and a depth d of 0.139 mm, and a ratio (d/W) of 0.046.

Figure 15:
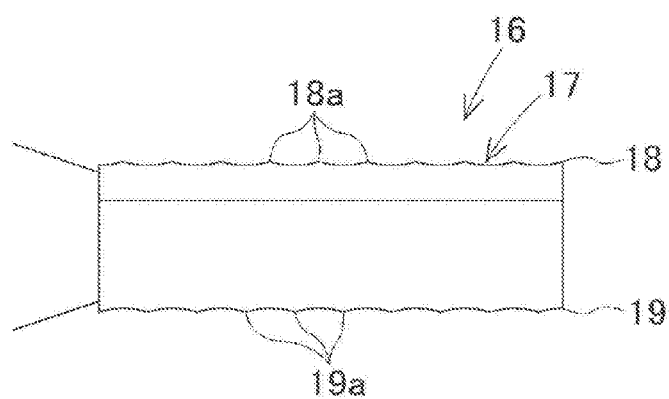
FIG. 15 is an enlarged front view showing a body portion of an end mill according to Example 2 under magnification.

Next, Example 2 will be described with reference to the drawings. FIG. 15 is an enlarged front view of a body 17 of an end mill 16 according to Example 2. At two positions circumferentially separated by 180 deg. on an outer circumference, the body 17 has a pair of cutting edges 18, 19 extending in a rotation axis direction. Each of the cutting edges 18, 19 comprises a plurality of segmental edges 18a, 19a successively arranged in the rotation axis direction and having the same pitch P (the same length). An edge of each of the segmental edges 18*a*, 19*a* has a shape of an arc dented radially with an edge arc radius R. The segmental edges 18*a* are shifted by a half pitch in the rotation axis direction with respect to the segmental edges 19*a*. Processing Example 13 using the end mill 16 will be described hereinafter in a similar way to Example 1. Data of Processing Example 13 are shown above in Table 1.

Figure 16A:
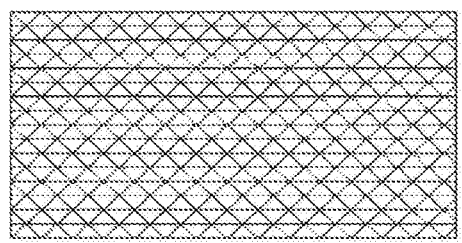
FIG. 16A is a plan view showing Processing Example 13 using the end mill according to Example 2.
Figure 16B:
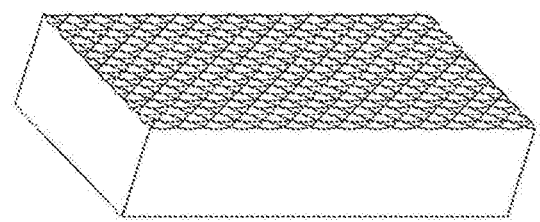
FIG. 16B is a perspective view showing Processing Example 13.

In Processing Example 13, a cutting diameter D=4 mm, the number of cutting edges Z=2, an edge arc radius R=2 mm in reverse (a concave shape), R/D=0.5, a pitch P=1.25 mm, the number of revolutions N=3000 rpm, a feed rate F=3.75 m/min, F/N=1.25 mm. Since an edge of each segmental edge has a concave shape in contrast to the convex shape of that of Processing Example 1, as shown in FIGS. 16A and 16B, a cut pattern of Processing Example 13 has a shape of the square grid of Processing Example 1 added by lines in a direction of machining. A knife mark has a width W of 1.250 mm and a depth d of 0.100 mm, and a ratio (d/W) of 0.080.

Figure 17:
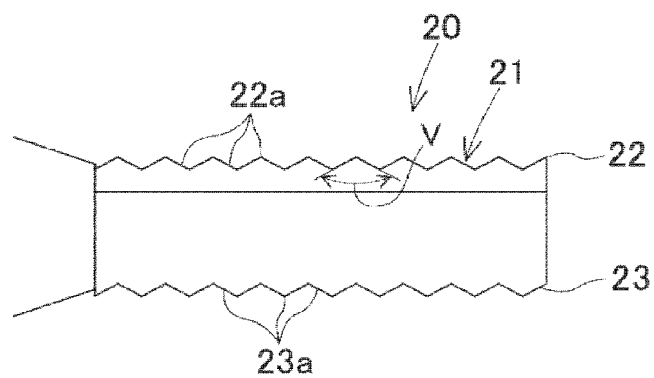
FIG. 17 is an enlarged front view showing a body portion of an end mill according to Example 3 under magnification.

Next, Example 3 will be described with reference to the drawings. FIG. 17 is an enlarged front view of a body 21 of an end mill 20 according to Example 3. At two positions circumferentially separated by 180 deg. on an outer circumference, the body 21 has a pair of cutting edges 22, 23 extending in a rotation axis direction. Each of the cutting edges 22, 23 comprises a plurality of segmental edges 22*a*, 23*a* successively arranged in the rotation axis direction and having the same pitch P (the same length). An edge of each of the segmental edges 22*a*, 23*a* has a shape of a ridge protruding in an isosceles triangle with an apex angle of 120 deg. The segmental edges 22*a* are shifted by a half pitch in the rotation axis direction with respect to the segmental edges 23*a*. Processing Example 14 using the end mill 20 will be described hereinafter in a similar way to Example 1. Data of Processing Example 14 are shown above in Table 1.

Figure 18A:
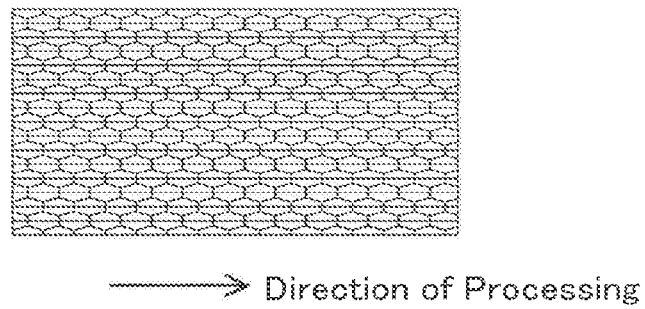
FIG. 18A is a plan view showing Processing Example 14 using the end mill according to Example 3.
Figure 18B:
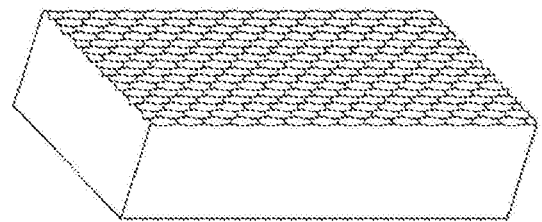
FIG. 18B is a perspective view showing Processing Example 14.

In Processing Example 14, a cutting diameter D=4 mm, the number of cutting edges Z=2, an edge apex angle V=120 deg. (a V shape), a pitch P=1.25 mm, the number of revolutions N=3000 rpm, a feed rate F=3.75 m/min, F/N=1.25 mm. Since an edge of each segmental edge has a ridge shape, as shown in FIGS. 18A and 18B, a cut pattern of Processing Example 14 has a shape of successively arranged hexagons which are long in a direction of machining and sectioned by lines extending in the direction of machining. A knife mark has a width W of 1.250 mm and a depth d of 0.234 mm, and a ratio (d/W) of 0.187.

Next, Example 4 will be described with reference. Unlike the end mill according to Example 1, an end mill according to Example 4 has cutting edges at three positions circumferentially separated by 120 deg. or at four positions circumferentially separated by 90 deg. on a body. When the end mill has cutting edges at three positions, segmental edges of one cutting edge are shifted by one third of a pitch in a rotation axis direction with respect to those of a neighboring cutting edge. When the end mill has cutting edges at four positions, segmental edges of one cutting edge are shifted by one fourth of a pitch in the rotation axis direction with respect to those of a neighboring cutting edge. Processing Examples 15, 16 using the end mill will be described hereinafter in a similar way to Example 1. Data of Processing Examples 15, 16 are shown above in Table 1.

Figure 19A:
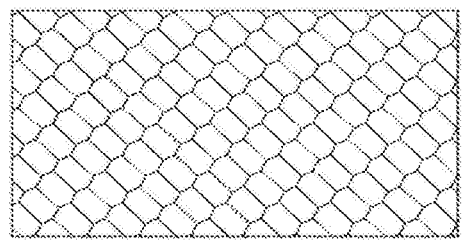
FIG. 19A is a plan view showing Processing Example 15 using an end mill according to Example 4.
Figure 19B:
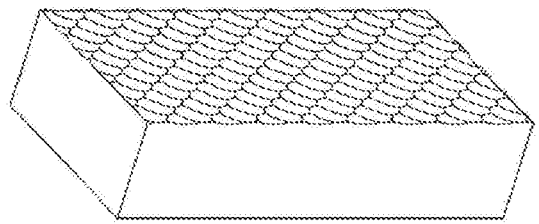
FIG. 19B is a perspective view showing Processing Example 15 using the end mill according to Example 4.

In Processing Example 15, a cutting diameter D=6 mm, the number of cutting edges Z=3, an edge arc radius R=3 mm, R/D=0.5, a pitch P=2.1 mm, the number of revolutions N=3000 rpm, a feed rate F=6.3 m/min, F/N=2.1 mm. Since the end mill has cutting edges at three positions and an edge of each segmental edge has a shape of an arc protruding outwardly, as shown in FIGS. 19A and 19B, a cut pattern of Processing Example 15 has a shape of a grid of longitudinally long hexagons slanted diagonally with respect to a direction of machining. A knife mark has a width W of 1.633 mm and a depth d of 0.116 mm, and a ratio (d/W) of 0.071.

Figure 20A:
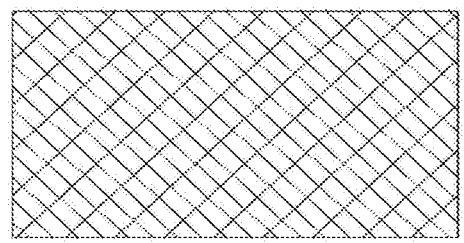
FIG. 20A is a plan view showing Processing Example 16 using the end mill according to Example 4.
Figure 20B:
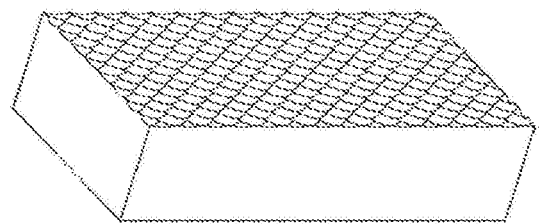
FIG. 20B is a perspective view showing Processing Example 16.

In Processing Example 16, a cutting diameter D=6 mm, the number of cutting edges Z=4, an edge arc radius R=3 mm, R/D=0.5, a pitch P=2 mm, the number of revolutions N=3000 rpm, a feed rate F=6 m/min, F/N=2 mm. Since the end mill has cutting edges at four positions and an edge of each segmental edge has a shape of an arc protruding outwardly, as shown in FIGS. 20A and 20B, a cut pattern of Processing Example 16 has a shape of longitudinally long rectangles slanted diagonally with respect to a direction of machining. A knife mark has a width W of 1.500 mm and a depth d of 0.106 mm, and a ratio (d/W) of 0.071.

Figure 21A:
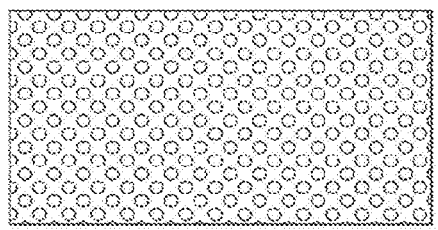
FIG. 21A is a plan view showing Processing Example 17 using an end mill according to Example 5.
Figure 21B:
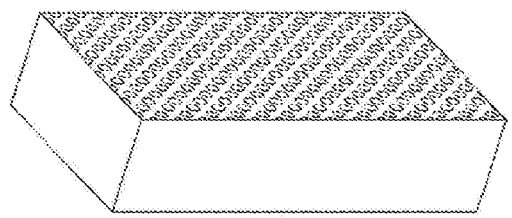
FIG. 21B is a perspective view showing Processing Example 17.

Next, Example 5 will be described with reference. In Example 5, the end mill 10 according to Processing Example 1 of Example 1 is used but, unlike in Processing Examples 1 to 16, cut depth of the cutting edges 14, 15 in a workpiece is only outer part (0.02 mm) of the segmental edges 14*a*, 15*a*. Processing Example 17 of Example 5 is shown in FIGS. 21A and 21B. Since the cut depth is 0.02 mm, a cut pattern of Processing Example 17 has a shape of small circular grooves located at positions corresponding to square corners of Processing Example 1 and separated from each other. A change in cut depth leads to a change in diameter of circular grooves.

Figure 22:
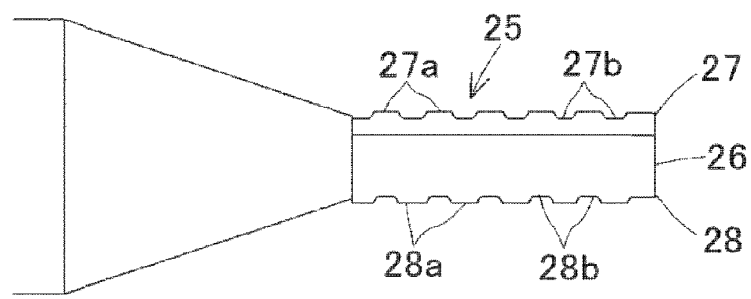
FIG. 22 is an enlarged front view showing a body portion of an end mill according to Example 6 under magnification.

Next, Example 6 will be described with reference to the drawings. FIG. 22 is an enlarged front view of a fore end side of a body 26 of an end mill 25 according to Example 6. At two positions circumferentially separated by 180 deg. on an outer circumference, the body 26 has a pair of cutting edges 27, 28 extending in a rotation axis direction. Each of the cutting edges 27, 28 comprises a plurality of segmental edges 27*a*, 28*a* successively arranged in the rotation axis direction while separated by concave portions 27*b*, 28*b* and having the same pitch P (the same length). An edge of each of the segmental edges 27*a* and 28*a* is a flat blade extending in parallel to a rotation axis direction. The segmental edges 27*a* are shifted by a half pitch in the rotation axis direction with respect to the segmental edges 28*a*. Processing Example 18 using the end mill 25 will be described hereinafter in a similar way to Example 1. Data of Processing Example 18 are shown above in Table 1.

Figure 23A:
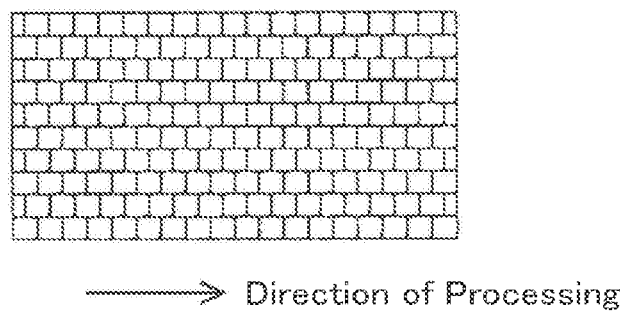
FIG. 23A is a plan view showing Processing Example 18 using the end mill according to Example 6.
Figure 23B:
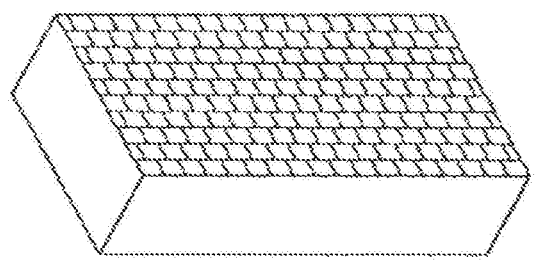
FIG. 23B is a perspective view showing Processing Example 18.

In Processing Example 18, a cutting diameter D=4 mm, the number of cutting edges Z=2, a pitch P=2 mm, the number of revolutions N=3000 rpm, a feed rate F=3 m/min, F/N=1 mm. Since the edges are flat planes, as shown in FIGS. 23A and 23B, a cut pattern of Processing Example 18 has approximately square shapes arranged continuously in lines in a direction of machining. A knife mark has a width W of 1.000 mm and a depth d of 0.064 mm, and a ratio (d/W) of 0.064.

Figure 24:
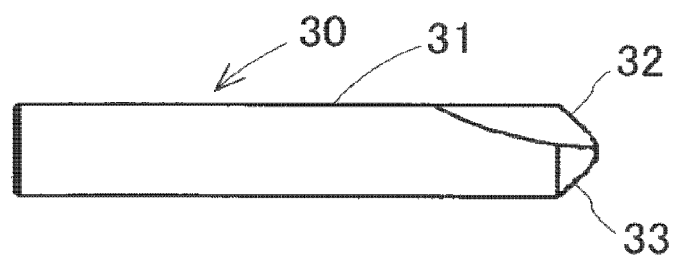
FIG. 24 is a front view showing an end mill according to Example 7.
Figure 25:
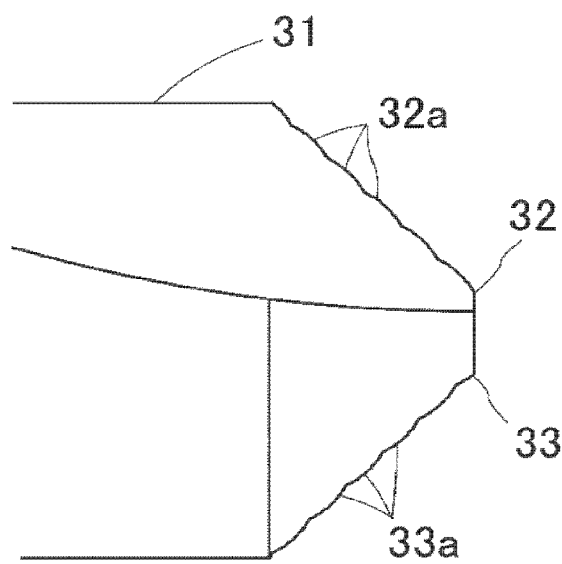
FIG. 25 is an enlarged front view showing a body fore end side of the end mill according to Example 7 under magnification.

Next, Example 7 will be described with reference to the drawings. FIG. 24 is a front view of an end mill 30 according to Example 7, and FIG. 25 is an enlarged front view of a fore end side of a body 31 of the end mill 30. In Example 7, unlike in Examples 1 to 6 above, the fore end side of the body 31 on which cutting edges are formed has slanted surfaces cut away at approximately 45 deg. with respect to an axial direction. The body 31 has cutting edges 32, 33 at two positions circumferentially separated by 180 deg. on an outer circumference. Each of the cutting edges 32, 33 comprises a plurality of segmental edges 32*a*, 33*a* successively arranged along a slant and having the same pitch P (the same length). An edge of each of the segmental edges 32a, 33a has a shape of an arc protruding outwardly with an edge arc radius R. The segmental edges 32a are shifted by a half pitch in a slant direction with respect to the segmental edges 33a. Since the cutting edges 32, 33 are arranged on slants, respectively, a cutting diameter of each of the segmental edges 32a, 33a at a position to cut per rotation of the endmill 30 gets smaller toward a fore end side. Processing Example 19 using the endmill 30 of Example 7 will be described hereinafter. A cutting diameter D, the number of cutting edges Z, an edge arc radius R, a pitch P, the number of revolutions N, a feed rate F, F/N, a knife mark width W, a depth d, and a ratio (d/W) of Processing Example 19 are shown below in Table 2. Note that in Processing Example 19, a workpiece is cut to depth of the entire edges.

TABLE 2

|  | Cutting Diameter D mm | Number of Cutting Edges Z | Edge Arc Radius R mm | Ratio R/D | Pitch P mm | Number of Revolutions N rpm | Feed Rate F m/min | F/N mm | Knife Mark Width W mm | Depth d mm | Ratio d/W |
|---|---|---|---|---|---|---|---|---|---|---|---|
| Processing Example 19 | 2-12 | 2 | 2 | 0.167-1 | 1.25 | 3000 | 3.75 | 1.25 | 1.250 | 0.052 | 0.042 |
| Processing Example 20 | 4-12 | 2 | 2 | 0.167-0.5 | 1.3 | 3000 | 3.75 | 1.25 | 1.250 | 0.088 | 0.070 |
| Processing Example 21 | 8-12 | 2 | 2 | 0.167-0.25 | 1.275 | 3000 | 3 | 1 | 1.000 | 0.048 | 0.048 |

Figure 26A:
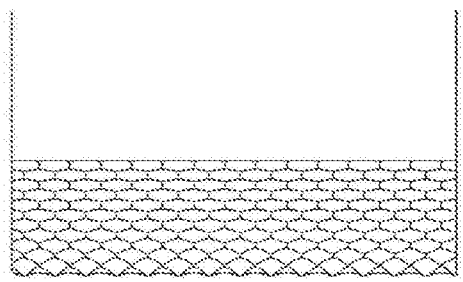
FIG. 26A is a plan view showing Processing Example 19 using the end mill according to Example 7.
Figure 26B:
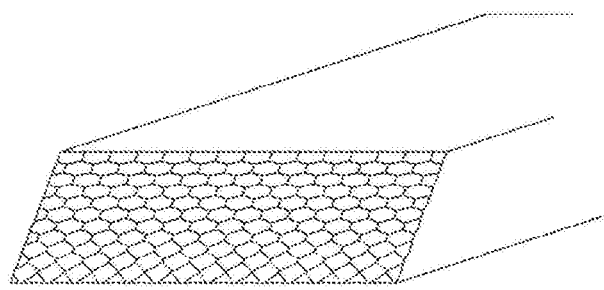
FIG. 26B is a perspective view showing Processing Example 19.

In Processing Example 19, a minimum cutting diameter D=2 mm, the number of cutting edges Z=2, an edge arc radius R=2 mm, R/D=1, a pitch P=1.25 mm, the number of revolutions N=3000 rpm, a feed rate F=3.75 m/min, F/N=1.25 mm. Since the cutting edges 32, 33 are arranged on slants, as shown in FIGS. 26A and 26B, a cut pattern of Processing Example 19 on a slanted surface can be formed on a workpiece edge, etc. and give fresh aesthetic appearance which is different from a cut pattern on a plane. Additionally, since the diameter of the segmental edges 32a, 32b continuously changes, hexagons long in a direction of machining on a shank side of the cutting edges get gradually longer in a perpendicular direction to the direction of machining and further changes into approximately rhombus shapes at a fore end side of the cutting edges. Thus a cut pattern also continuously changes and offers a fresh decorative effect. A knife mark has a width W of 1.250 mm and a depth d of 0.052 mm, and a ratio (d/W) of 0.042.

Figure 27:
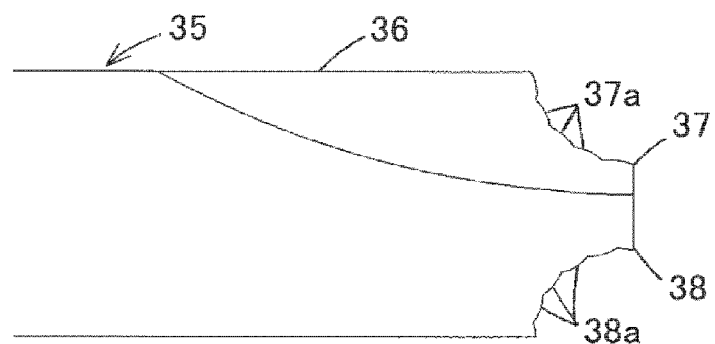
FIG. 27 is an enlarged front view showing a body fore end side of an end mill according to Example 8 under magnification.

Next, Example 8 will be described with reference to the drawings. FIG. 27 is a partial enlarged front view of a fore end side of a body 36 of an end mill 35 according to Example 8. In Example 8, unlike in Example 7, the fore end side of the body 36 on which cutting edges are formed has arcuate surfaces cut away in an one fourth circle shape. The body 36 has cutting edges 37, 38 at two positions circumferentially separated by 180 deg. on an outer circumference thereof. Each of the cutting edges 37, 38 comprises a plurality of segmental edges 37a, 38a successively arranged along an arc and having the same pitch P (the same length). An edge of each of the segmental edges 37a, 38a has a shape of an arc protruding outwardly with an edge arc radius R. The segmental edges 37a are shifted by a half pitch in a slanted direction with respect to the segmental edges 38a. Since the cutting edges 37, 38 are arranged on arcs, a cutting diameter of each of the segmental edges 37a, 38a at a position to cut per rotation of the endmill 35 gets smaller toward a fore end side. Processing Example 20 using the end mill 35 of Example 8 will be described hereinafter. Data of Processing Example 20 are shown above in Table 2.

Figure 28A:
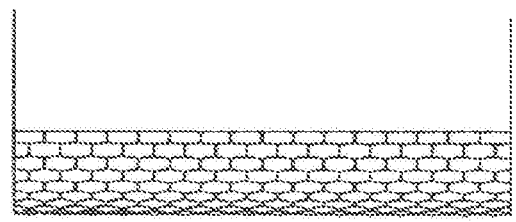
FIG. 28A is a plan view showing Processing Example 20 using the end mill according to Example 8.
Figure 28B:
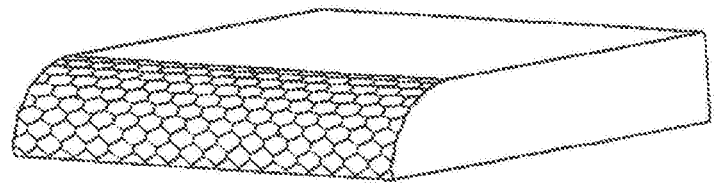
FIG. 28B is a perspective view showing Processing Example 20.

In Processing Example 20, a minimum cutting diameter D=4 mm, the number of cutting edges Z=2, an edge arc radius R=2 mm, R/D=0.5, a pitch P=1.3 mm, the number of revolutions N=3000 rpm, a feed rate F=3.75 m/min, F/N=1.25 mm. Since the cutting edges 37, 38 are arranged on arcs, as shown in FIGS. 28A and 28B, a cut pattern of Processing Example 20 protruding in an one fourth circle profile on a slanted surface can be formed on a workpiece edge, etc. and give fresh aesthetic appearance which is different from a cut pattern on a plane. Additionally, since the cutting diameter of the segmental edges 37a, 38a continuously changes, rectangles long in a direction of machining on a shank side of the cutting edges gradually change into hexagons and further change into approximately rhombus shapes at a fore end side of the cutting edges. Thus a cut pattern also continuously changes and offers a fresh decorative effect. A knife mark has a width W of 1.250 mm and a depth d of 0.088 mm, and a ratio (d/W) of 0.070.

Figure 29:
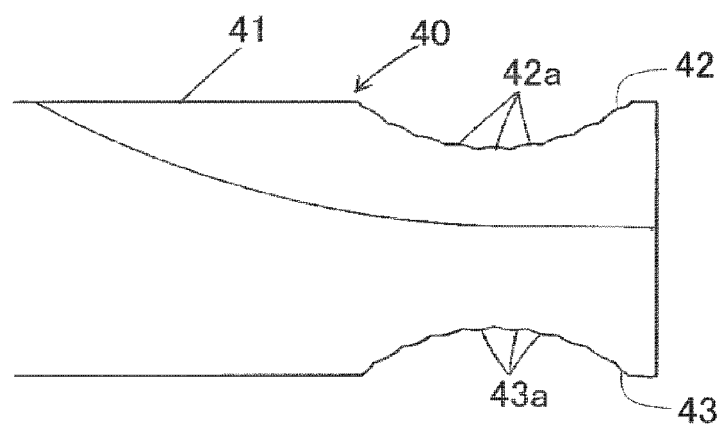
FIG. 29 is an enlarged front view showing a body fore end side of an end mill according to Example 9 under magnification.

Next, Example 9 will be described with reference to the drawings. FIG. 29 is a partial enlarged front view of a fore end side of a body 41 of an end mill 40 according to Example 9. In Example 9, the fore end side of the body 41 on which cutting edges are formed has arcuate surfaces cut away in an arc shape in which the cutting edges curve downward to an axis and then curve upward to an outside as they approach the fore end. The body 41 has cutting edges 42, 43 at two positions circumferentially separated by 180 deg. on an outer circumference thereof. Each of the cutting edges 42, 43 comprises a plurality of segmental edges 42a, 43a successively arranged along an arc and having the same pitch P (the same length). An edge of each of the segmental edges 42a, 43a has a shape of an arc protruding outwardly with an edge arc radius R. The segmental edges 42a are shifted by a half pitch in a slanted direction with respect to the segmental edges 43a. Since the cutting edges 42, 43 are arranged on arcs, an outer diameter of each of the segmental edges 42a, 43a at a position to cut per rotation of the end mill 40 gets smaller toward an axial center. Processing Example 21 using the end mill 40 of Example 9 will be described hereinafter. Data of Processing Example 21 are shown above in Table 2.

Figure 30A:
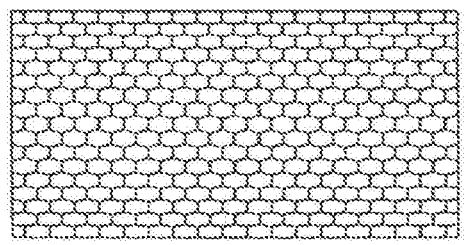
FIG. 30A is a plan view showing Processing Example 21 using the end mill according to Example 9.
Figure 30B:
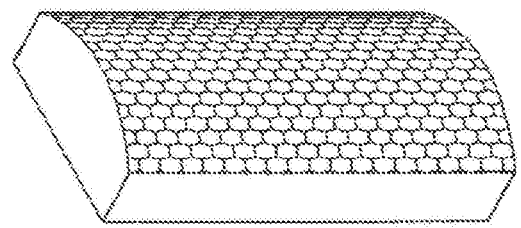
FIG. 30B is a perspective view showing Processing Example 21.
Figure 31A:
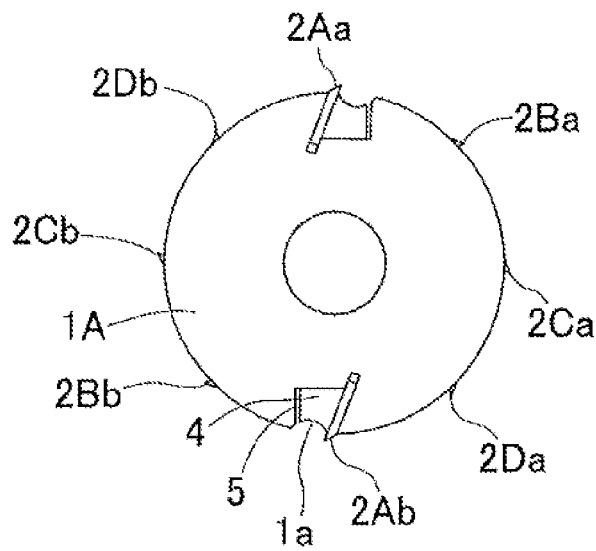
FIG. 31A is a front view showing a cutter block as a conventional example.
Figure 31B:
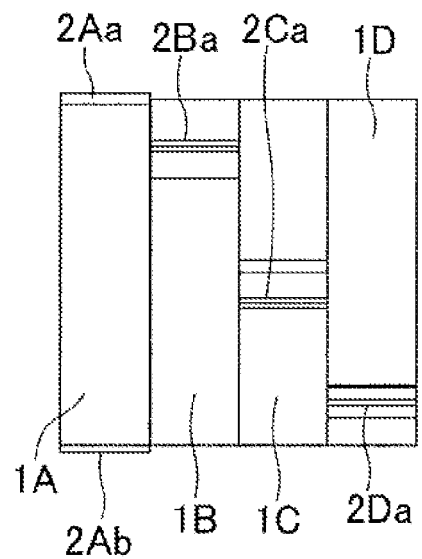
FIG. 31B is a right side view showing the cutter block shown in FIG. 31A.
Figure 32:
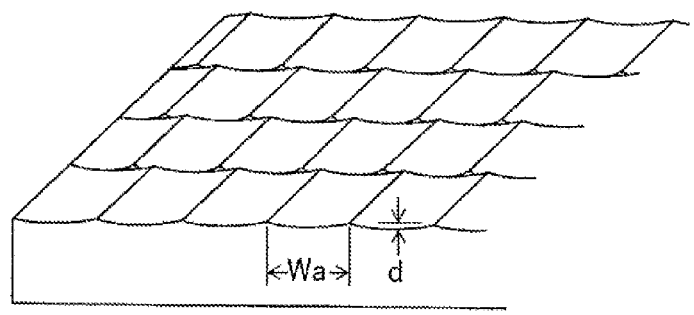
FIG. 32 is a perspective view showing a processing example using the cutter block shown in FIG. 31A.

In Processing Example 21, a minimum cutting diameter D=8 mm, the number of cutting edges Z=2, an edge arc radius R=2 mm, R/D=0.25, a pitch P=1.275 mm, the number of revolutions N=3000 rpm, a feed rate F=3 m/min, F/N=1 mm. Since the cutting edges 42, 43 are arranged in arcs which are axially symmetrical to each other, as shown in FIGS. 30A and 30B, a cut pattern of Processing Example 21 protruding symmetrically in an arc shape can be formed on a workpiece and give fresh aesthetic appearance which is different from a cut pattern on a plane. Additionally, since the diameter of the segmental edges 42a, 43a continuously changes, approximately regular hexagons at a center of each of the cutting edges change into approximately hexagonal shapes which are long in a direction of machining at both ends of each of the cutting edges. Thus a cut pattern continuously changes and offers a fresh decorative effect. A knife mark has a width W of 1.000 mm and a depth d of 0.048 mm, and a ratio (d/W) of 0.048.

As a result of the above, in each of Examples 1 to 9 above, a ratio of depth d to width W (d/W) of a knife mark formed on a surface of a workpiece by rotationally cutting the surface of the workpiece using the end mill 10, 16, 20, 25, 30, 35, or 40 is set to be not less than 3/100. Therefore, a height difference in embossments of the knife mark formed on the surface of the workpiece can be fully recognized. As a result, the knife mark formed regularly on the surface of the workpiece can give sufficiently aesthetic appearance as a decorative pattern. Moreover, since the segmental edges 14a, 18a, 22a, 27a, 32a, 37a, or 42a of the cutting edge 14, 18, 22, 27, 32, 37, or 42 at one of the plurality of positions are shifted by some degree of pitch with respect to the segmental edges 15a, 19a, 23a, 28a, 33a, 38a, or 43a of the cutting edges 15, 19, 23, 28, 33, 38, or 43 at a neighboring one of the plurality of positions in Examples 1 to 4, arrangement of a knife mark can be variously changed in accordance with shift by the degree of pitch and aesthetic appearance of a decorative pattern can be further improved. Furthermore, a ratio of an edge arc radius R of each of the segmental edges 14a, 15a, 18a, 19a, 32a, 33a, 37a, 38a, 42a, 43a to a cutting diameter D (R/D) of each of the end mills 10, 16, 20, 30, 35, 40 is set to fall within a range of from 0.2 to 5, or an edge apex angle V of each of the segmental edges 22a, 23a is changed. Therefore, arrangement of a knife mark can be variously changed in accordance with the size of the edge arc radius R or the edge apex angle V and aesthetic appearance of the decorative pattern can be further improved. Note that in Examples 7 to 9 (Processing Examples 19 to 21), with a change in cutting diameter D, a ratio (R/D) changes and some values are smaller than 0.2 but especially when the ratio (R/D) falls within a range of 0.2 or more, an effect of improving aesthetic appearance of a decorative pattern given by a variety of changes in arrangement of a knife mark is remarkably exhibited.

Moreover, since the cutting diameter of each of the cutting edges 14, 15, 18, 19, 22, 23, 27, 28 was set to be as small as not more than 20 mm, it becomes easy to substantially increase a ratio (d/W), so a clear decorative pattern with a great height difference in embossments can be obtained. Moreover, in Example 5, a dot pattern giving aesthetic appearance can be formed by decreasing cut depth of the cutting edges 14, 15. As a result, in Examples 1 to 6, a high value-added decoration which gives sufficiently aesthetic appearance can be formed by rotationally cutting a surface of a workpiece.

Moreover, in Examples 7 to 9, owing to employment of the slanted cutting edges 32, 33 or the curved cutting edges 37, 38, 42, 43, a cut pattern on a slanted surface or a curved surface can be formed on a workpiece edge, etc., and can give fresh aesthetic appearance which is different from a cut pattern on a plane. Moreover, owing to a continuous change in the diameter of the segmental edges 32a, 33a, 37a, 38a, 42a, 43a, a cut pattern also continuously changes and offers a fresh decorative effect.

Moreover, in the present examples, since a knife mark formed on a surface of a workpiece has a sufficiently great height difference in embossments, the surface of the workpiece can serve a good nonskid function. Furthermore, upon cutting a surface of lighting equipment, light diffuses at embossed portions and accordingly, the surface of the workpiece can be brighter than other portions. Thus, design quality of the lighting equipment can be improved. Furthermore, in a case of a surface of a metal workpiece, a knife mark can give an oil reservoir function in addition to the decorative function.

It should be noted that the cut surfaces described in the above examples are just examples and a variety of cut patterns can be obtained by changing a cutting diameter D of cutting edges, the number of cutting edges Z, a cutting edge arc radius R, a pitch P, the number of revolutions N of a cutting tool, and a feed rate F. Moreover, although the end mills are used as rotating cutting tools in the above examples, milling machines, cutter blocks, etc. can be used instead of the end mills. In addition, the abovementioned examples are just examples and various changes and modifications may be made within the scope not departing from the gist of the present invention.

REFERENCE SIGNS LIST 10, 16, 20, 25, 30, 35, 40 . . . End mill, 11 . . . Shank, 13, 17, 21 . . . Body, 14, 15, 18, 19, 22, 23, 27, 28, 32, 33, 37, 38, 42, 43 . . . Cutting Edges, 14a, 15a, 18a, 19a, 22a, 23a, 27a, 28a, 32a, 33a, 37a, 38a, 42a, 43a . . . Segmental cutting edge

The invention claimed is:

1. A processing method for a surface of a workpiece using a rotating cutting tool, comprising:
   forming a cut pattern by rotationally cutting a surface of a workpiece using a rotating cutting tool having cutting edges extending in a rotation axis direction at a plurality of circumferentially separated positions on an outer circumference of a body thereof, wherein
   each of the cutting edges comprises a plurality of segmental edges segmented at an equal pitch in the rotation axis direction,
   a ratio of depth d to width W (d/W) of a knife mark formed on the surface of the workpiece by the segmental edges is not less than 3/100,
   a cutting diameter D of the cutting edges is not more than 20 mm, and
   the surface of the workpiece is processed for a purpose of processing a decorative surface or forming an oil reservoir.

2. A processing method for a surface of a workpiece using a rotating cutting tool, comprising:
   forming a cut pattern by rotationally cutting a surface of a workpiece using a rotating cutting tool having slanted cutting edges extending slantedly with respect to a rotation axis or curved cutting edges extending curvedly with respect to the rotation axis at a plurality of circumferentially separated positions on an outer circumference of a body thereof, wherein
   each of the slanted cutting edges or each of the curved cutting edges comprises a plurality of segmental edges segmented at an equal pitch along a slant or a curve, and
   a ratio of depth d to width W (d/W) of a knife mark formed on the surface of the workpiece by the plurality of segmental edges is not less than 3/100,
   a cutting diameter D of the cutting edges is not more than 20 mm, and
   the surface of the workpiece is processed for a purpose of processing a decorative surface or forming an oil reservoir.

3. The processing method for a surface of a workpiece using a rotating cutting tool according to claim 1, wherein segmental edges of a cutting edge located at one of the plurality of positions are shifted in the rotation axis direction with respect to segmental edges of a cutting edge located at one of the plurality of positions neighboring in a rotation direction.

4. The processing method for a surface of a workpiece using a rotating cutting tool according to claim 1, wherein an edge of each of the segmental edges has a convex or concave arc shape, and a ratio of an edge arc radius R to a cutting diameter D of the cutting edges (R/D) falls within a range of 0.2 to 5.

5. The processing method for a surface of a workpiece using a rotating cutting tool according to claim 1, wherein each of the segmental edges has a triangular ridge shape.

6. The processing method for a surface of a workpiece using a rotating cutting tool according to claim 2, wherein segmental edges of a cutting edge located at one of the plurality of positions are shifted in the rotation axis direction with respect to segmental edges of a cutting edge located at one of the plurality of positions neighboring in a rotation direction.

7. The processing method for a surface of a workpiece using a rotating cutting tool according to claim 2, wherein an edge of each of the segmental edges has a convex or concave arc shape, and a ration of an edge arc radius R to a cutting diameter D of the cutting edges (R/D) falls within a range of 0.2 to 5.

8. The processing method for a surface of a workpiece using a rotating cutting tool according to claim 2, wherein each of the segmental edges has a triangular ridge shape.

9. The processing method for a surface of a workpiece using a rotating cutting tool according to claim 1, wherein only an outward part of the cutting edges is partially cut into the workpiece to process the cut pattern including grooves which separate from each other.

10. The processing method for a surface of a workpiece using a rotating cutting tool according to claim 2, wherein only an outward part of the cutting edges is partially cut into the workpiece to process the cut pattern including grooves which separate from each other.

* * * * *